United States Patent
Jain et al.

(10) Patent No.: US 11,492,104 B2
(45) Date of Patent: Nov. 8, 2022

(54) MAGNETIC SELF-CENTERING SHIMMY DAMPER

(71) Applicant: GOODRICH CORPORATION, Charlotte, NC (US)

(72) Inventors: Bhuwan Jain, Mississauga (CA); Simon Lucas, Burlington (CA); Benedict Sy, Mississauga (CA)

(73) Assignee: GOODRICH CORPORATION, Charlotte, NC (US)

( * ) Notice: Subject to any disclaimer, the term of this patent is extended or adjusted under 35 U.S.C. 154(b) by 216 days.

(21) Appl. No.: 16/823,817

(22) Filed: Mar. 19, 2020

(65) Prior Publication Data

US 2021/0291967 A1 Sep. 23, 2021

(51) Int. Cl.
*B64C 25/50* (2006.01)
*F16F 6/00* (2006.01)
*F16F 15/03* (2006.01)

(52) U.S. Cl.
CPC ............ *B64C 25/505* (2013.01); *F16F 6/005* (2013.01); *F16F 15/03* (2013.01); *F16F 2222/06* (2013.01)

(58) Field of Classification Search
CPC ........ F16F 6/005; F16F 15/03; F16F 2222/06; B64C 25/505; B64C 25/50; B64C 25/58; B64C 25/62
See application file for complete search history.

(56) References Cited

U.S. PATENT DOCUMENTS

| | | | |
|---|---|---|---|
| 4,432,441 | A | 2/1984 | Kurokawa |
| 10,024,379 | B2 | 7/2018 | Schmidt et al. |
| 10,364,832 | B2 | 7/2019 | Maries |
| 2015/0166196 | A1 | 6/2015 | Wilson et al. |
| 2017/0016502 | A1 | 1/2017 | Simonneaux et al. |
| 2017/0102047 | A1 | 4/2017 | Himmelmann |
| 2018/0086440 | A1 | 3/2018 | Nguyen et al. |

FOREIGN PATENT DOCUMENTS

| | | | | |
|---|---|---|---|---|
| CN | 107191530 A | * | 9/2017 | |
| CN | 107021212 | | 3/2019 | |
| DE | 102017116228 A1 | * | 1/2019 | ............ F16F 9/0218 |
| EP | 2778047 | | 9/2014 | |
| EP | 3118479 | | 1/2017 | |

OTHER PUBLICATIONS

Euroepan Patent Office, European Search Report dated Jul. 20, 2021 in Application No. 21163709.5.

* cited by examiner

*Primary Examiner* — Melanie Torres Williams
(74) *Attorney, Agent, or Firm* — Snell & Wilmer L.L.P.

(57) ABSTRACT

A shimmy damper for centering a landing gear includes a cap and a housing. The shimmy damper further includes a damper shaft extending from the cap to the housing. The shimmy damper further includes a plurality of magnets configured to exert an opposing force on the cap and the housing via the damper shaft, providing a centering mechanism of the damper shaft within the housing. This centering action in turn provides for the centering of the landing gear during flight.

18 Claims, 5 Drawing Sheets

MAGNETIC SELF-CENTERING SHIMMY DAMPER

FIELD

The present disclosure relates to landing gear of aircraft and, more particularly, to shimmy dampers for use in landing gear of aircraft.

BACKGROUND

Aircraft includes landing gear to support the aircraft during taxi, takeoff, and landing. The landing gear may be stowed in a bay during flight. A shimmy damper may be installed on the landing gear to provide shimmy damping during ground operations, and centering of the landing gear during flight. Without this centering, the landing gear may contact the aircraft body, potentially resulting in the landing gear failing to extend, as well as potential damage to the aircraft or landing gear.

SUMMARY

Disclosed herein is a shimmy damper for centering a landing gear. The shimmy damper includes a cap and a housing. The shimmy damper further includes a damper shaft extending from the cap to the housing. The shimmy damper further includes a plurality of magnets configured to exert an opposing force on the cap and the housing via the damper shaft. The damper shaft may be centered inside the housing through the magnets.

In any of the foregoing embodiments, the plurality of magnets includes: a first shaft magnet and a second shaft magnet each coupled to the damper shaft, the first shaft magnet being located closer to the cap than the second shaft magnet; a cap magnet configured to be repelled by the first shaft magnet and to exert a force on the cap; and a housing magnet configured to be repelled by the second shaft magnet and to exert a force on the housing in an opposite direction than the force exerted on the cap by the cap magnet.

In any of the foregoing embodiments, the cap magnet is coupled to the cap and the housing magnet is coupled to the housing.

In any of the foregoing embodiments, the shimmy damper is configured to be coupled to a joint of the landing gear of an aircraft.

In any of the foregoing embodiments, the joint is formed between an upper torque link and a lower torque link.

In any of the foregoing embodiments, the damper shaft has a first end configured to be coupled to the upper torque link.

In any of the foregoing embodiments, the damper shaft has a second end configured to be coupled to the lower torque link.

In any of the foregoing embodiments, the plurality of magnets replaces a Belleville spring of the shimmy damper.

Also disclosed is shimmy damper for centering a landing gear. The shimmy damper includes a cap and a housing. The shimmy damper further includes a damper shaft extending from the cap to the housing. The shimmy damper further includes a plurality of magnets configured to exert an opposing force on the cap and the housing via the damper shaft. The shimmy damper is configured to be coupled to a joint of the landing gear.

In any of the foregoing embodiments, the plurality of magnets includes: a first shaft magnet and a second shaft magnet each coupled to the damper shaft, the first shaft magnet being located closer to the cap than the second shaft magnet; a cap magnet configured to be repelled by the first shaft magnet and to exert a force on the cap; and a housing magnet configured to be repelled by the second shaft magnet and to exert a force on the housing in an opposite direction than the force exerted on the cap by the cap magnet.

In any of the foregoing embodiments, the cap magnet is coupled to the cap and the housing magnet is coupled to the housing.

In any of the foregoing embodiments, the joint is formed between an upper torque link and a lower torque link.

In any of the foregoing embodiments, the damper shaft has a first end configured to be coupled to the upper torque link.

In any of the foregoing embodiments, the damper shaft has a second end configured to be coupled to the lower torque link.

In any of the foregoing embodiments, the plurality of magnets replaces a Belleville spring of the shimmy damper.

Also disclosed is a shimmy damper for centering a landing gear. The shimmy damper includes a cap and a housing. The shimmy damper further includes a damper shaft extending from the cap to the housing. The shimmy damper further includes a plurality of magnets configured to exert an opposing force on the cap and the housing via the damper shaft, the plurality of magnets including: a first shaft magnet and a second shaft magnet each coupled to the damper shaft, the first shaft magnet being located closer to the cap than the second shaft magnet, a cap magnet configured to be repelled by the first shaft magnet and to exert a force on the cap, and a housing magnet configured to be repelled by the second shaft magnet and to exert a force on the housing in an opposite direction than the force exerted on the cap by the cap magnet.

In any of the foregoing embodiments, the cap magnet is coupled to the cap and the housing magnet is coupled to the housing.

In any of the foregoing embodiments, the shimmy damper is configured to be coupled to a joint of the landing gear of an aircraft.

In any of the foregoing embodiments, the joint is formed between an upper torque link and a lower torque link.

In any of the foregoing embodiments, the damper shaft has a first end configured to be coupled to the upper torque link and a second end configured to be coupled to the lower torque link.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1:
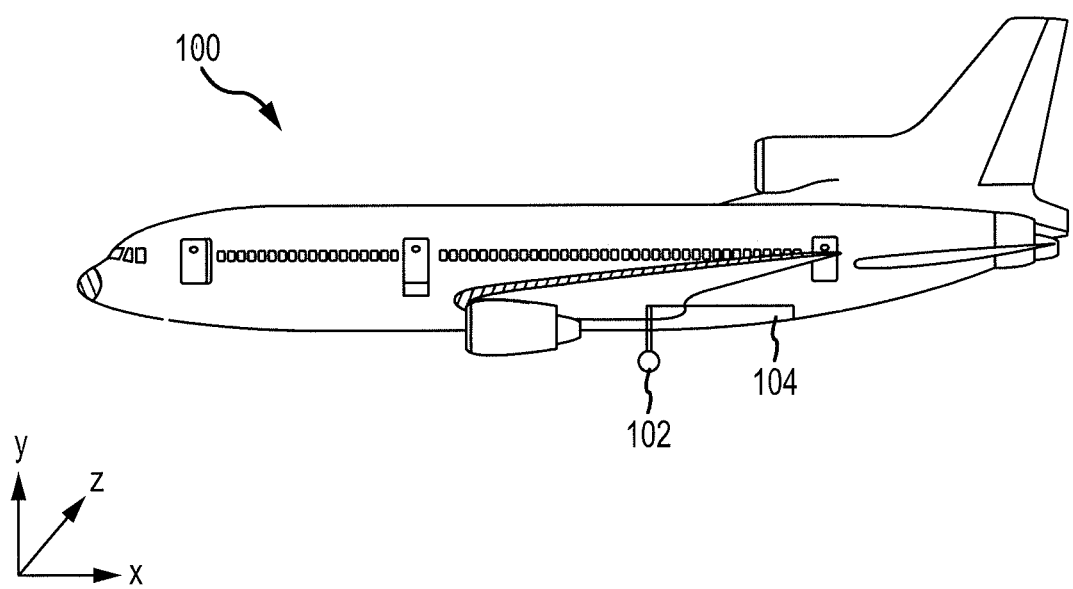
FIG. 1 illustrates an aircraft with a landing gear, in accordance with various embodiments.

Referring now to FIG. 1, an aircraft 100 may include one or more landing gear 102 which may be deployed during taxi, takeoff, and landing, and may be stowed in a bay 104 during flight. An X-Y-Z axis is shown throughout the drawings to illustrate the relative location of components.

Figure 2:
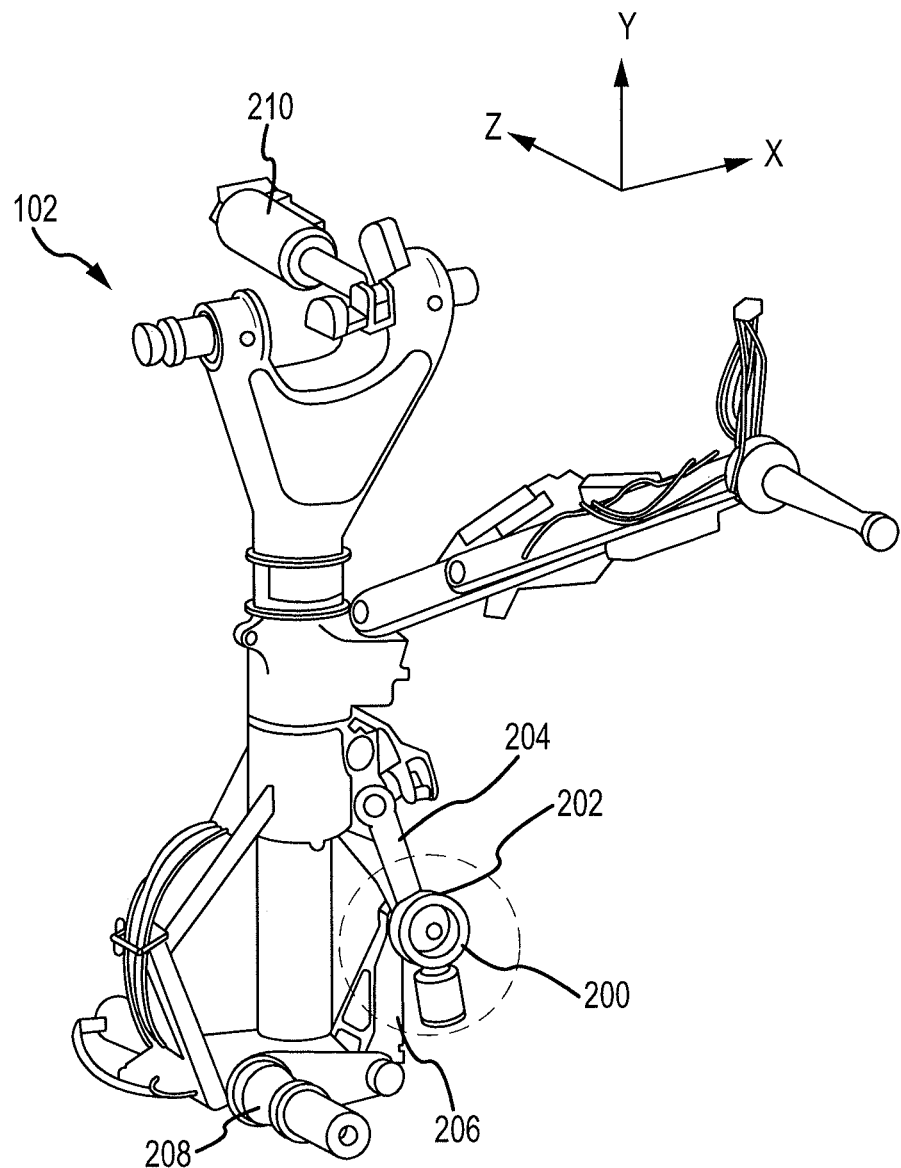
FIG. 2 illustrates details of the landing gear of FIG. 1, in accordance with various embodiments.

Referring now to FIG. 2, additional details of the landing gear 102 are shown. The landing gear 102 may have a top 210 designed to be coupled to an aircraft and a bottom 208 on which one or more wheel assembly is installed. In various embodiments, the top 210 may be coupled to, or include, a retract actuator or another component. In that regard, the top 210 may be directly or indirectly coupled to the aircraft.

The landing gear 102 may include a shimmy damper 200. The shimmy damper 200 may provide for centering of the landing gear 102 in response to the landing gear 102 being stowed. The shimmy damper 200 may be installed at a joint 202 of the landing gear 102. In particular, the shimmy damper 200 may be installed between a lower torque link 206 and an upper torque link 204. In various embodiments, the shimmy damper 200 may also provide some damping of the landing gear 102.

Figure 3:
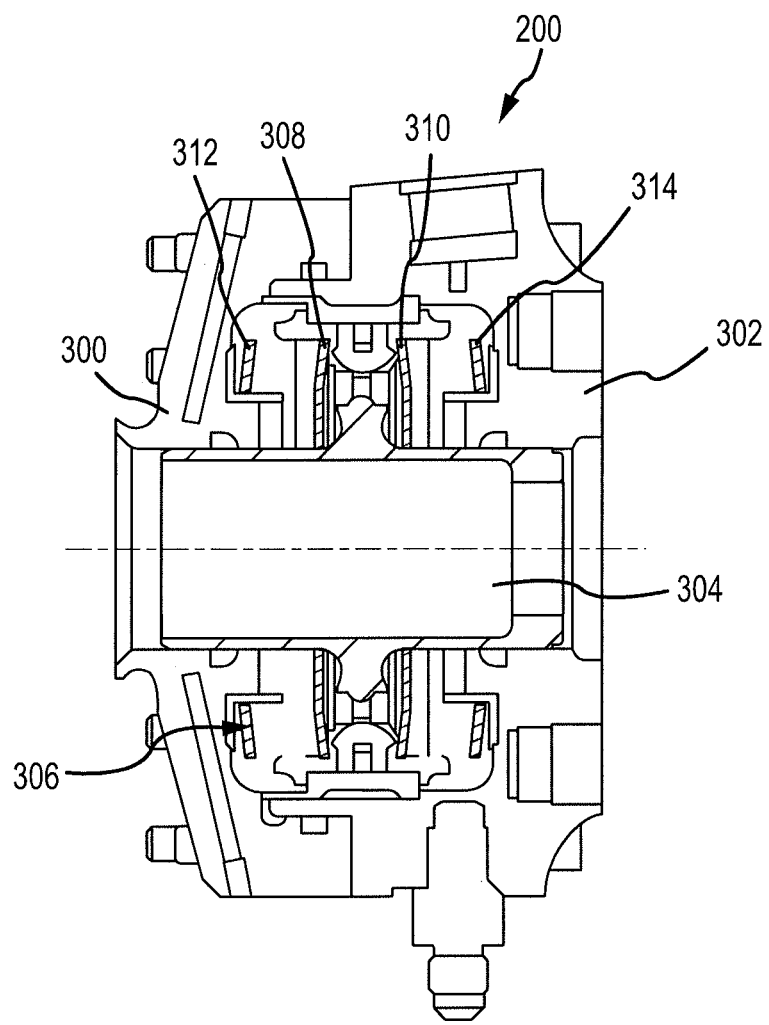
FIG. 3 illustrates a shimmy damper of the landing gear of FIG. 2, in accordance with various embodiments.

Turning now to FIG. 3, a cross-sectional view of the shimmy damper 200 is shown. The features of the shimmy damper 200 may be enclosed within a housing 302 and a cap 300. The shimmy damper 200 may include a damper shaft 304 extending therethrough. The damper shaft 304 may be used in conjunction with hydraulics to provide hydraulic damping of the landing gear 102 of FIG. 1 during ground operations.

Figure 4:
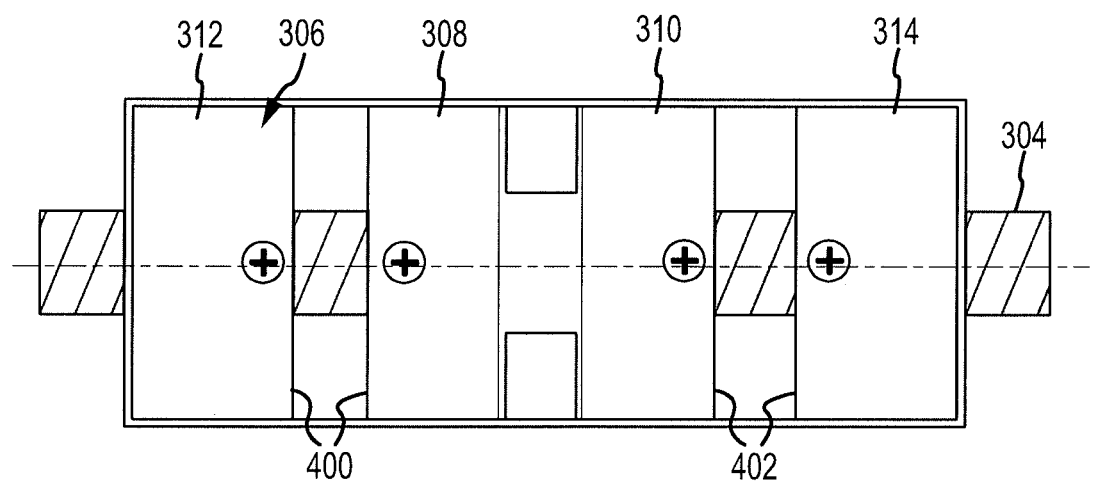
FIG. 4 illustrates a plurality of magnets of the shimmy damper of FIG. 3, according to various embodiments.

The shimmy damper 200 may further include a plurality of magnets 306. The plurality of magnets 306 may be designed to exert an opposing force on the cap 300 and the housing 302 via the damper shaft 304. In particular and referring to FIGS. 3 and 4, the plurality of magnets 306 may include a first shaft magnet 308 and a second shaft magnet 310 each coupled to the damper shaft 304. In various embodiments, the first shaft magnet 308 and the second shaft magnet 310 may be formed integral with the damper shaft 304. The plurality of magnets 306 may further include a cap magnet 312 and a housing magnet 314. The cap magnet 312 may be in contact with the cap 300, and the housing magnet 314 may be in contact with the housing 302. In various embodiments, the cap magnet 312 may be coupled to the cap 300 and the housing magnet 314 may be coupled to the housing 302. The cap magnet 312 and the housing magnet 314 may be permanent magnets. In various embodiments, at least one of the magnets 312, 314 may be electromagnets and, therefore, may be controlled by a controller. In that regard, the controller may adjust the strength (i.e., the amplitude of the Mega Gauss Oersteds (MGOe)) and the polarity of the magnets 312, 314.

The first shaft magnet 308 and the cap magnet 312 may exert an opposing force on each other, and the second shaft magnet 310 and the housing magnet 314 may likewise exert an opposing force on each other. That is, opposing faces 400 of the first shaft magnet 308 and the cap magnet 312 may have the same polarity, and opposing faces 402 of the second shaft magnet 310 and the housing magnet 314 may have the same polarity. These opposing forces may act on the cap 300 and the housing 302, urging them away from each other. This opposing force on the cap 300 and the housing 302 provides centering of the damper shaft 304, which in turn provides centering of the landing gear 102 during flight.

Use of the plurality of magnets 306 provides various advantages. For example, a Belleville spring, which may include a set of Belleville spring washers, were used to provide the centering action. Over time, the Belleville spring washers may degrade, reducing the centering action, as well as potentially resulting in fatigue failure of the Belleville spring washers. Because the plurality of magnets 306 operate without contacting parts, the shimmy damper 200 may have an extended lifetime relative to conventional shimmy dampers.

Figure 5:
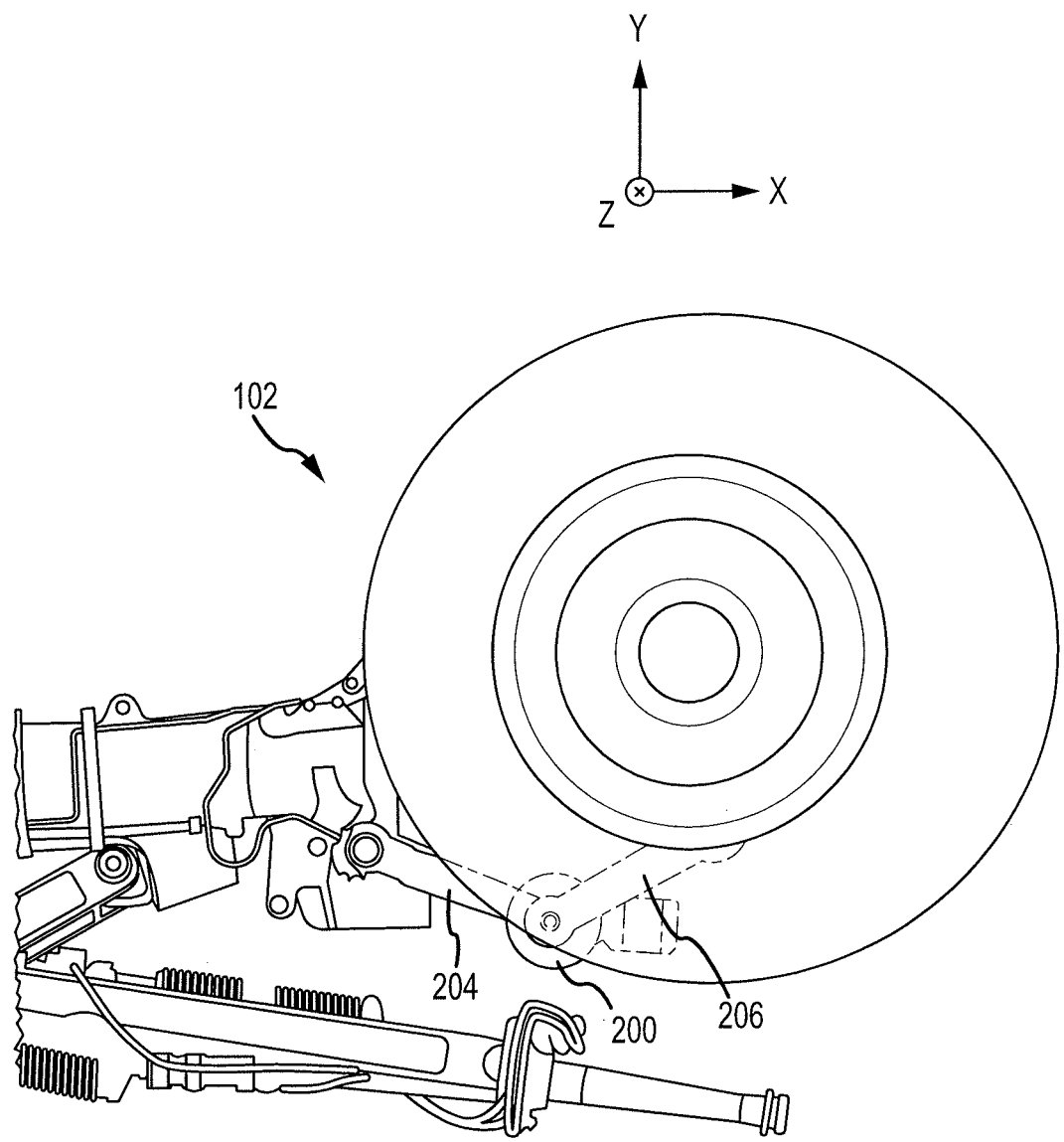
FIG. 5 illustrates the landing gear of FIG. 1 in a stowed position, according to various embodiments.

Referring now to FIG. 5, the landing gear 102 is shown in a stowed position. As shown, the shimmy damper 200 is located between the lower torque link 206 and the upper torque link 204. The plurality of magnets 306 of FIG. 3 provides centering action along the Z axis (i.e., into and out of the page).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A shimmy damper for centering a landing gear, the shimmy damper comprising:
    a cap;
    a housing;
    a damper shaft extending from the cap to the housing; and
    a plurality of magnets configured to exert an opposing force on the cap and the housing via the damper shaft, wherein the plurality of magnets includes:
        a cap magnet configured to be repelled by a first shaft magnet and to exert a force on the cap; and
        a housing magnet configured to be repelled by a second shaft magnet and to exert a force on the housing in an opposite direction than the force exerted on the cap by the cap magnet.

2. The shimmy damper of claim 1, wherein the plurality of magnets further includes:
    the first shaft magnet and the second shaft magnet each coupled to the damper shaft, the first shaft magnet being located closer to the cap than the second shaft magnet.

3. The shimmy damper of claim 2, wherein the cap magnet is coupled to the cap and the housing magnet is coupled to the housing.

4. The shimmy damper of claim 1, wherein the damper shaft has a first end configured to be coupled to the upper torque link.

5. The shimmy damper of claim 4, wherein the damper shaft has a second end configured to be coupled to the lower torque link.

6. The shimmy damper of claim 1, wherein the shimmy damper is configured to be coupled to a joint of the landing gear of an aircraft.

7. A shimmy damper for centering a landing gear, the shimmy damper comprising:
    a cap;
    a housing;
    a damper shaft extending from the cap to the housing; and
    a plurality of magnets configured to exert an opposing force on the cap and the housing via the damper shaft, wherein the plurality of magnets includes:
        a cap magnet configured to be repelled by a first shaft magnet and to exert a force on the cap; and
        a housing magnet configured to be repelled by a second shaft magnet and to exert a force on the housing in an opposite direction than the force exerted on the cap by the cap magnet
    wherein the shimmy damper is configured to be coupled to a joint of the landing gear.

8. The shimmy damper of claim 7, wherein the plurality of magnets further includes:
    the first shaft magnet and the second shaft magnet each coupled to the damper shaft, the first shaft magnet being located closer to the cap than the second shaft magnet.

9. The shimmy damper of claim 8, wherein the cap magnet is coupled to the cap and the housing magnet is coupled to the housing.

10. The shimmy damper of claim 7, wherein the damper shaft has a first end configured to be coupled to the upper torque link.

11. The shimmy damper of claim 10, wherein the damper shaft has a second end configured to be coupled to the lower torque link.

12. The shimmy damper of claim 7, wherein the joint is formed between an upper torque link and a lower torque link.

13. A shimmy damper for centering a landing gear, the shimmy damper comprising:
    a cap;
    a housing;
    a damper shaft extending from the cap to the housing; and
    a plurality of magnets configured to exert an opposing force on the cap and the housing via the damper shaft, the plurality of magnets including:
        a first shaft magnet and a second shaft magnet each coupled to the damper shaft, the first shaft magnet being located closer to the cap than the second shaft magnet,
        a cap magnet configured to be repelled by the first shaft magnet and to exert a force on the cap, and
        a housing magnet configured to be repelled by the second shaft magnet and to exert a force on the housing in an opposite direction than the force exerted on the cap by the cap magnet.

14. The shimmy damper of claim 13, wherein the cap magnet is coupled to the cap and the housing magnet is coupled to the housing.

15. The shimmy damper of claim 13, wherein the damper shaft has a first end configured to be coupled to the upper torque link and a second end configured to be coupled to the lower torque link.

16. The shimmy damper of claim 6, wherein the joint is formed between an upper torque link and a lower torque link.

17. The shimmy damper of claim 13, wherein the shimmy damper is configured to be coupled to a joint of the landing gear of an aircraft.

18. The shimmy damper of claim 17, wherein the joint is formed between an upper torque link and a lower torque link.

\* \* \* \* \*